(12) United States Patent
Agnoni et al.

(10) Patent No.: US 8,300,622 B2
(45) Date of Patent: Oct. 30, 2012

(54) SYSTEMS AND METHODS FOR TANDEM FREE OPERATION SIGNAL TRANSMISSION

(75) Inventors: Francesco Agnoni, Cori (IT);
Maddalena Calzolari, Perugia (IT);
Andrea Franco, Rome (IT); Massimo Quagliani, Rome (IT); Paolo Spallaccini, Montegabbione (IT);
Alessio Terzani, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 995 days.

(21) Appl. No.: 11/564,992

(22) Filed: Nov. 30, 2006

(65) Prior Publication Data

US 2007/0121572 A1 May 31, 2007

(30) Foreign Application Priority Data

Nov. 30, 2005 (WO) ............... PCT/EP2005/056362

(51) Int. Cl.
*H04L 12/43* (2006.01)
*H04J 3/16* (2006.01)
*H04B 1/16* (2006.01)

(52) U.S. Cl. ......... 370/350; 370/458; 370/468; 455/208

(58) Field of Classification Search ............... 455/422.1, 455/63.1, 560, 517, 208; 370/350, 286, 362, 370/458, 468
See application file for complete search history.

(56) References Cited

U.S. PATENT DOCUMENTS

| | | | | |
|---|---|---|---|---|
| 6,108,560 | A * | 8/2000 | Navaro et al. | 455/517 |
| 6,556,844 | B1 * | 4/2003 | Mayer | 455/560 |
| 2003/0035501 | A1 * | 2/2003 | Hoppes | 375/362 |

OTHER PUBLICATIONS

"Digital cellular telecommunications system (Phase 2+); Universal Mobile Telecommunications System (UMTS); Inband Tandem Free Operation (TFO) of speech codecs; Service description; Stage 3 (3GPP TS 28.062 version 5.4.0 Release 5); ETSI TS 128 062" ETSI Standards, European Telecommunications Standards Institute, Sophia-Antipo, FR, vol. 3-SA4, No. V540. Sep. 2003 XP014017023 ISSN: 0000-0001 p. 36, paragraph 7-37, paragraph 7 p. 43, paragraph 7.10—p. 44, paragraph 7.10 p. 54, paragraph 9 p. 57, paragraphs 9.5, 9.7.1 p. 117, paragraph C.2.1 p. 120, paragraph C.3—p. 121, paragraph C.3 p. 125, paragraph C.3.3 p. 126, paragraph C.3.4.1—p. 127, paragraph C.3.4.1 Figures 4.2.1-1, 9-1, C.3-1.
European Patent Office International Search Report issued Aug. 3, 2006 for PCT/EP2005/056362.

* cited by examiner

*Primary Examiner* — George Eng
*Assistant Examiner* — Nizar Sivji

(57) ABSTRACT

Systems and methods are provided for reducing signal distortion during tandem free operation signal transmission from a first mobile station to a second mobile station over a network; the systems and methods reduce the signal distortion in tandem free operation mobile to mobile communications that occurs when there is a loss of synchronicity between a plurality of transcoder rate adapter units that is caused by oscillation of the transcoder rate adapter units between different functional states during signal transmission. The systems and methods of the invention reduce the time gaps that are associated with these oscillations, resulting in reduced signal distortion and improved signal transmission.

16 Claims, 7 Drawing Sheets

SYSTEMS AND METHODS FOR TANDEM FREE OPERATION SIGNAL TRANSMISSION

This application claims the benefit of International patent application number PCT/EP2005/056362 filed on Nov. 30, 2005, the disclosure of which is fully incorporated herein by reference.

FIELD OF THE INVENTION

The present invention relates generally to tandem free operation signal transmission for mobile to mobile communications. More specifically, the present invention relates to reducing signal distortion in tandem free operation mobile to mobile communications that occurs when transcoder rate adapter units oscillate between different operational states during signal transmission.

BACKGROUND OF THE INVENTION

A known call configuration used for sending human speech from a first mobile telephone to a second mobile telephone over a network involves tandem operation. In tandem operation, the speech is encoded at the first mobile telephone into a compressed form to save bandwidth, which is the amount of data that can be passed along a communications channel in a given period of time.

This encoded speech is then transmitted from the mobile station through the air over a Radio Frequency (RF) Interface to a first base station. A transcoder rate adapter unit (TRAU) associated with the first base station takes the encoded speech signal and decodes it into a different and decompressed format so that it can be transmitted through a fixed telephone network to a second base station.

The decompressed format used for transmission through a fixed telephone network may be generally a 64 kbps G.711 A-law or μ-law or other standard format. At this second base station, the decompressed speech must be encoded for a second time into a compressed format where it is then transmitted again through the air over an RF Interface to the second mobile station.

A second transcoder rate adapter unit associated with the second base station performs this second encoding operation. At the second mobile station this encoded compressed speech is finally decoded to audible human speech.

The drawback to this call configuration is that it requires two encoding/decoding operations, and each one of these operations degrades the quality of the final speech signal that is heard by the person using the second mobile telephone (i.e., the person listening to someone else talk over a mobile telephone).

Tandem Free Operation (TFO) eliminates this drawback by sending human speech from a first mobile telephone to a second mobile telephone over a network with a reduced the number of coding/decoding operations performed on the speech signal. In tandem free operation, the speech is encoded at the first mobile telephone and is not decoded until it is received by the second mobile telephone. Tandem free operation eliminates the need to decode the signal at the first base station into the 64 kbps format and to then encode the signal at the second base station back into compressed format.

Tandem free operation bypasses this procedure and instead uses in-band signaling to send the speech signal in its originally compressed form from the first mobile telephone to the second mobile telephone. This is accomplished by sending the compressed speech signal through the fixed telephone network as a series of tandem free operation frames (TFO frames) included as part of the in-band communication between the components involved in the operation. This eliminates a coding/decoding (collectively "codec") operation and results in a better quality speech signal.

Existing tandem free operation protocols are not without drawbacks. In order for tandem free operation to function properly, among other things the transcoder rate adapter units on both ends of the operation must be in proper communication with each other. Transcoder rate adapter units operate in many different functional states. One of these functional states is known as the operation state, and another is known as the synchronization lost state. During the back and forth communication that occurs during speech signal transmission, these components may switch or oscillate between states. This oscillation is especially prevalent in instances of high propagation delay during communication between two TRAUs.

A problem arises when one component, such as a TRAU associated with a base station, switches into the synchronization lost state, but a TRAU associated with the another base station is functioning in the operation state. When this occurs, at least one of the TRAUs may stop sending or receiving the speech signal for a period of time. This signal distortion due to components involved in speech signal transmission oscillating between different functional states leads to time gaps in the speech that reduce the quality of speech heard at the second mobile telephone.

SUMMARY OF THE INVENTION

From the foregoing, it is apparent there is a direct need to solve the problem of reduced speech quality resulting from transcoder rate adapter unit (TRAU) oscillations between functional states, while still allowing for tandem free operation. Further, it is desirable to reduce the time period of the speech gaps that occur when a TRAU is failing to send or receive TFO frames due to oscillation between functional states.

In satisfaction of these needs, the aim of the present invention is to solve this problem and others by providing systems and methods related to reducing signal distortion during tandem free operation signal transmission from a first mobile station to a second mobile station over a network. To increase efficiency and reduce cost, the systems and methods of the invention may be implemented on existing networks.

Further, the invention reduces or eliminates the time gaps and associated speech signal distortion that result from oscillation of the transcoder rate adapter units from a first functional state to a second functional state. This improves the quality of the resulting speech signal heard by a listener at the second mobile station.

This aim and others are achieved by a method for improving quality during tandem free operation signal transmission over a network comprising a first transcoder rate adapter unit and a second transcoder rate adapter unit, the method comprising the steps of: transmitting a plurality of tandem free operation frames from the first transcoder rate adapter unit to the second transcoder rate adapter unit; detecting a state change of the first transcoder rate adapter unit from an operation state to a synchronization lost state; and transmitting from the first transcoder rate adapter unit to the second transcoder rate adapter at least one synchronization lost message embedded in a number of tandem free operation frames sufficient to include the at least one synchronization lost message.

This aim and others are achieved by a method for improving quality during tandem free operation signal transmission over a network comprising a first transcoder rate adapter unit and a second transcoder rate adapter unit, the method comprising the steps of receiving by the second transcoder rate adapter unit from the first transcoder rate adapter unit at least one synchronization lost message embedded in a number of tandem free operation frames sufficient to embed the at least one synchronization lost message, determining the second transcoder rate adapter unit is either in operation state or synchronization lost state state, and if the second transcoder rate adapter unit is in operation state state, continuing sending tandem free operation frames from the second transcoder rate adapter unit to the first transcoder rate adapter unit and discarding the at least one received synchronization lost message, if the second transcoder rate adapter unit is in synchronization lost state state, changing from synchronization lost state to operation state state and start sending tandem free operation frames from first transcoder rate adapter unit to the second transcoder rate adapter unit and discarding the at least one received synchronization lost message.

The above mentioned aim and others are also achieved by a first transcoder rate adapter unit for improving quality during tandem free operation signal transmission over a network comprising the first transcoder rate adapter unit and a second transcoder rate adapter unit, the first transcoder rate adapter unit comprising a transmitter adapted to transmit a plurality of tandem free operation frames to the second transcoder rate adapter unit, a detector adapted to detect a state change of the first transcoder rate adapter unit from an operation state to a synchronization lost state, wherein the transmitter is adapted to transmit to the second transcoder rate adapter unit at least one synchronization lost message embedded in a number of tandem free operation frames sufficient to embed the at least one synchronization lost message.

The above mentioned aim and others are also achieved by a second transcoder rate adapter unit for improving quality during tandem free operation signal transmission over a network comprising a first transcoder rate adapter unit and the second transcoder rate adapter unit, the second transcoder rate adapter unit comprising a receiver adapted to receive from the first transcoder rate adapter unit at least one synchronization lost message embedded in a number of tandem free operation frames sufficient to embed the at least one synchronization lost message, a processor adapted to determine if the second transcoder rate adapter unit is either in operation state or synchronization lost state state, and if the second transcoder rate adapter unit is in operation state state, the processor being adapted to instruct a transmitter to continue sending tandem free operation frames to the first transcoder rate adapter unit, and to discard the at least one received synchronization lost message, if the second transcoder rate adapter unit is in synchronization lost state state, the processor being adapted to initiate a changing from synchronization lost state to operation state state, to instruct the transmitter to start sending tandem free operation frames to the second transcoder rate adapter unit, and to discard the at least one received synchronization lost message. The second transcoder rate adapter unit may comprise a processor being adapted to de-embed the at least one synchronization lost message before discarding the at least one synchronization lost message. The processing unit may be adapted to process any of the described configurations of tandem free operation frames and synchronization lost messages.

Sending, after entering the synchronization lost state, further tandem free operation frames (carrying partly the signal that is to be transmitted from the first transcoder rate adapter unit to the second transcoder rate adapter unit) together with the at least one embedded synchronization lost message prolongs the time in which tandem free operation frames are received at the second transcoder rate adapter unit while standardization and architectural requirements are met as the synchronization lost state can be indicated to the second transcoder rate adapter unit, i.e. status information about the first transcoder rate adapter unit is transferred to the second transcoder rate adapter unit. The additionally sent tandem free operation frames with embedded at least one synchronization lost message extends thus the signal information that is to be carried to the second transcoder rate adapter unit and keeps the second transcoder rate adapter unit in operation state as additional tandem free operation frames are received at the second transcoder rate adapter unit and the second transcoder rate adapter unit is configured to discard the received synchronization lost messages. The reduction in the length of the time gap and the prolonged stay of the second of the second transcoder rate adapter unit improves the quality of the signal clearly perceivable as reduced interruptions by the user of a mobile terminal associated to the second transcoder rate adapter unit, e.g. no or alleviated speech dropouts. A single synchronization lost message (SYL) may also be embedded in three tandem free operation frames in response to state change to meet architectural requirements, i.e. according to current relation one SYL message can be best embedded into three tandem free operation frames.

Furthermore, the systems and methods of the invention may send four SYL messages when changing state from operation state (OPE) to synchronization lost state (SOS) where at least one SYL message is embedded according to the invention. Embodiments of the invention may also detect a plurality of subsequent state changes of the first transcoder rate adapter unit from the operation state to the synchronization lost state; and transmit, from the first transcoder rate adapter unit to the second transcoder rate adapter unit, an increasing number of synchronization lost messages embedded in an increasing number of tandem free operation frames in response to each of the plurality of subsequent state changes. This testing has the advantage of consecutively filling time gaps so that after each subsequent state change detection one more SYL message is embedded and three more tandem free operation messages may be sent.

Finally, the above mentioned problem may be solved by a program storage medium readable by a computer, tangibly embodying a program of instructions executable by the computer to perform method steps for improving quality during tandem free operation signal transmission over a network comprising a first transcoder rate adapter unit and the second transcoder rate adapter unit, the method steps comprising transmitting a plurality of tandem free operation frames from the first transcoder rate adapter unit to the second transcoder rate adapter unit, detecting a state change of the first transcoder rate adapter unit from an operation state to a synchronization lost state, and transmitting from the first transcoder rate adapter unit to the second transcoder rate adapter at least one synchronization lost message embedded in a number of tandem free operation frames sufficient to embed the at least one synchronization lost message.

Furthermore, the problems are solved by a program storage medium readable by a computer, tangibly embodying a program of instructions executable by the computer to perform method steps for improving quality during tandem free operation signal transmission over a network comprising a first transcoder rate adapter unit and a second transcoder rate adapter unit, the method comprising the steps of receiving by the second transcoder rate adapter unit from the first transcoder rate adapter unit at least one synchronization lost message embedded in a number of tandem free operation frames sufficient to embed the at least one synchronization lost message, determining the second transcoder rate adapter unit is either in operation state or synchronization lost state state, and if the second transcoder rate adapter unit is in operation state state, continuing sending tandem free operation frames from the second transcoder rate adapter unit to the first transcoder rate adapter unit and discarding the at least one received synchronization lost message, if the second transcoder rate adapter unit is in synchronization lost state state, changing from synchronization lost state to operation state state and start sending tandem free operation frames from first transcoder rate adapter unit to the second transcoder rate adapter unit and discarding the at least one received synchronization lost message.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION OF THE INVENTION

Figure 1:
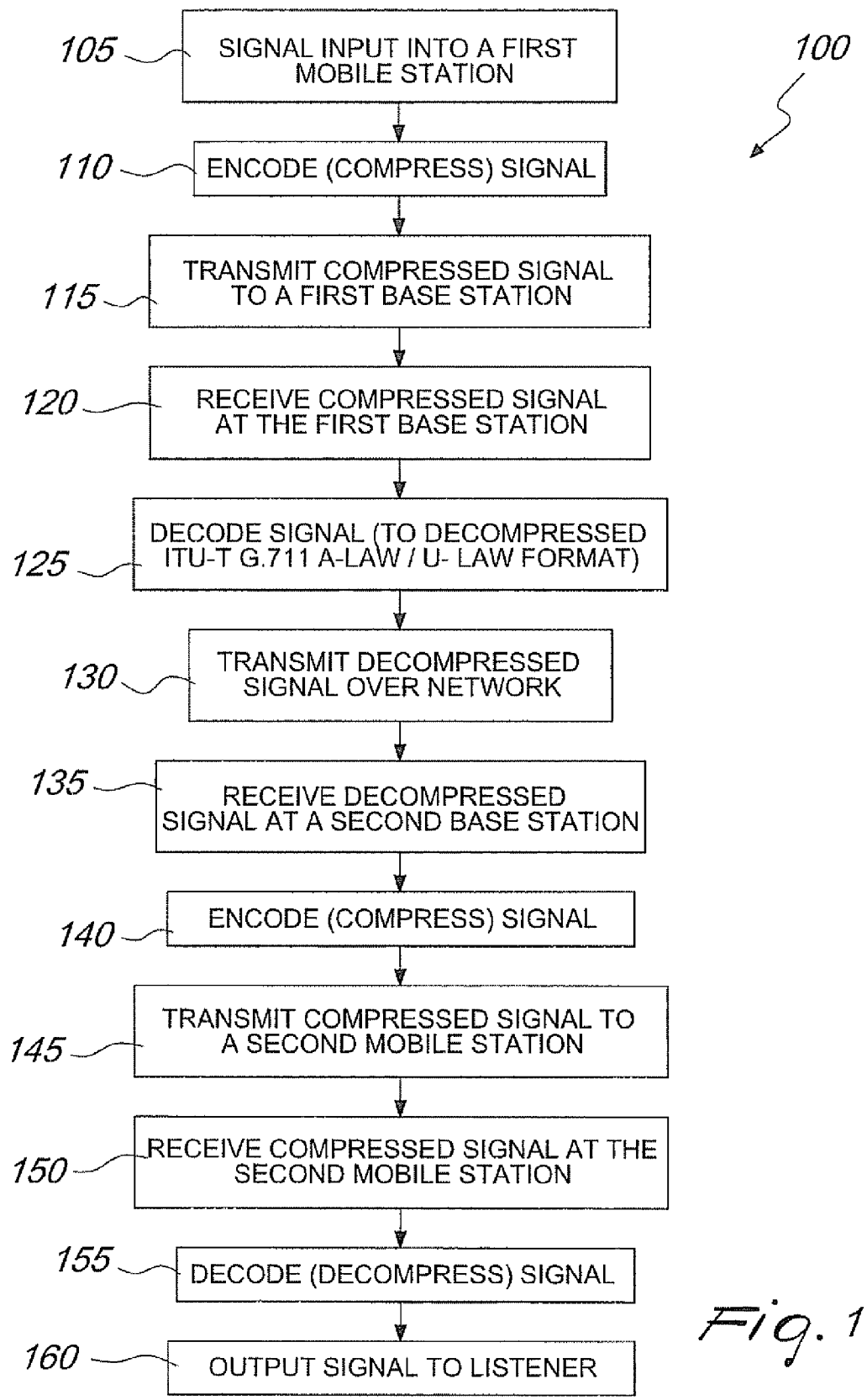
FIG. 1 is a flow chart depicting tandem operation protocol for mobile station to mobile station communication in accordance with an embodiment of the invention.

As shown in the drawings for the purposes of the illustration, the invention may be embodied in systems and methods for reducing signal distortion during tandem free operation signal transmission from a first mobile station to a second mobile station over a network. These systems and methods reduce or eliminate the time period of speech gaps that occur as a result of oscillation of transcoder rate adapter units between different functional states. Embodiments of the invention allow for improved signal transmission and may be implemented over existing networks.

In brief overview, FIG. 1 is a flow chart depicting a method 100 of tandem operation protocol for mobile station to mobile station communication in accordance with an embodiment of the invention. Method 100 illustrates the speech signal degradation associated with tandem operation. The first step in flowchart 100 is generally inputting an audio signal into a first mobile station (STEP 105). Typically this is human speech as a person speaks into a device such as a mobile telephone during the course of a standard telephone call. The speech signal is then encoded into compressed format (STEP 110). Typically, this encoding takes place at the first mobile station. Once encoded, the compressed signal is transmitted from the first mobile station to a first base station (STEP 115). In general, this transmission radio frequency (RF) transmission through the air. The compressed signal is then received at the first base station (STEP 120). Typically the first base station includes a transceiver capable of receiving this signal. In tandem (but not in tandem free) operation, the compressed signal received at the first base station (STEP 120) must be decoded to a decompressed format (STEP 125). This decompressed format used for tandem operation may be a standard ITU-T G7.11 A-law/μ-law format. This decoding process (STEP 125) associated with tandem operation results in a degraded signal, however, in tandem operation this is necessary for the next step of transmitting the decompressed signal over a fixed network (STEP 130). The transmission of the decompressed signal (STEP 130) generally includes transmission by any means over any available telephone or communications network.

The next step in method 100 is generally to receive the decompressed signal at a second base station (STEP 135). The decompressed signal may be received at the second base station (STEP 135) with the assistance of a transceiver associated with the second base station. In tandem (but not in tandem free) operation, another encoding step is necessary at this point. Typically in tandem operation the received decompressed signal is again encoded into a compressed format (STEP 140). This second encoding step (STEP 140) typically occurs at the second base station, and generally involves an encoder. In certain instances, this encoder may encode the signal into the same format the signal was originally encoded into by the first mobile station. However, this additional encoding step (STEP 140) further degrades the quality of the signal. In certain instances, transcoder rate adapter units may be incorporated into a base station controller (BSC) or in a media gateway (MGW).

The encoded compressed signal is then transmitted to a second mobile station (STEP 145). This second mobile station may include a mobile telephone, and in a typical case the second mobile station is the mobile telephone associated with the end user who will hear the speech signal being transmitted. The compressed signal is then received at the second mobile station (STEP 150). Generally the signal is received (STEP 150) with the assistance of a transceiver associated with the second mobile station. Once received, the signal is again decoded and decompressed into an audible speech signal (STEP 155) where it is then outputted to a listener (STEP 160). In typical tandem operation, the signal must be encoded at a first mobile handset, decoded at a first base station, encoded again at a second base station, and then decoded at a second mobile station. This tandem operation results in two encoding/decoding (or "codec") operations, where each codec operation degrades the signal. Generally, flow diagram 100 may also operate in reverse. For example in all embodiments of the invention the first mobile station may act as a second mobile station, and the first base station may act as the second base station, and vice-versa. Advantageously, the systems and methods of tandem free operation of the present invention are generally operable with the same components (i.e., existing base stations, networks, etc.) that are used for tandem operation.

Figure 2:
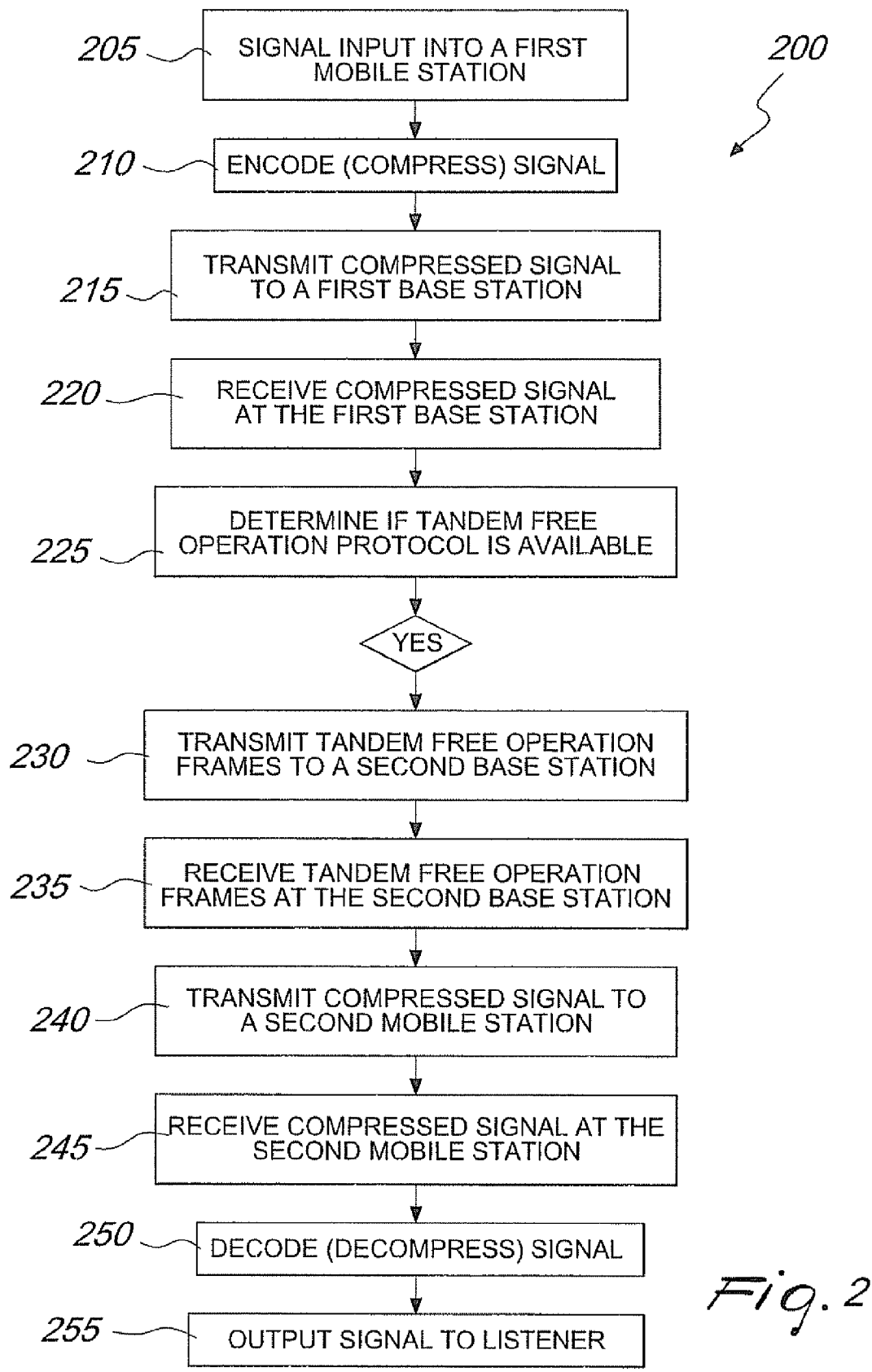
FIG. 2 is a flow chart depicting tandem free operation protocol for mobile station to mobile station communication in accordance with an embodiment of the invention.

The tandem free operation (TFO) illustrated in FIG. 2, bypasses one of the codec operations (and the associated signal degradation) necessary in tandem operation, and is generally capable of operating on existing networks and other components. As a result, tandem free operation generally results in a better quality speech signal than that resulting from tandem operation. In brief overview, FIG. 2 is a flow chart depicting a method 200 of tandem free operation protocol for mobile station to mobile station communication in accordance with an embodiment of the invention. Generally, in tandem free operation a signal such as audible speech is compressed at a first mobile station and is not decompressed until the signal reaches a second mobile station. The first few steps and the last few steps in method 200 are similar to those of tandem operation illustrated in method 100. In method 200 a signal, such as an audio signal like human speech, is inputted into a first mobile station (STEP 205). The next step of method 200 is to encode and thus compress the signal (STEP 210), this generally occurs at the first mobile station. The compressed signal is then transmitted to a first base station (STEP 215) and is received by the first base station (STEP 220). At this point in method 200 tandem free operation diverges from the tandem operation of method 100.

The next step in method 200 is to determine if tandem free operation is available (STEP 225). There are generally several requirements to tandem free operation that must be met in order to proceed. If the requirements are not met, tandem free operation is not possible, and the communication will typically proceed with tandem operation illustrated in method 100. Determining if tandem free operation protocol is available (STEP 225) generally includes transmitting the signal from one mobile station to another mobile station. For example this may include a typical mobile or cellular telephone call from one mobile telephone to another mobile telephone. Further, the two mobile stations involved in the communication typically must use the same speech coding/decoding algorithms. Often, these are standardized algorithms, such as any of the Global System for Mobile Communications (GSM) standards, the European Telecommunications Standards Institute (ETSI) standards, or the Telecommunications Industry Associations (TIA) standards. In certain embodiments, tandem free operation protocol may only be available for communication between exactly two mobile stations, however in other embodiments, tandem free operation may occur in communication between more than two mobile stations, such as a multi-party conference call environment, or during three-way calling. Typically determining if tandem free operation protocol is available (STEP 225) includes communication and logic operations between various components associated with method 200, such as between a first base station and a second base station, such as a "handshake" between two transcoder and rate adapter units. This determining step (STEP 225) may also include determining if the path through which the compressed signal is transmitted is a transparent one. A transparent signal transmission is sometimes referred to as a clear signal transmission, and generally requires that the signal, for example an encoded compressed digital signal, is not modified during transmission. Any alteration or distortion resulting from extraneous components involved with the transmission of the signal should be avoided in order to have transparent digital signal transmission.

After determining that tandem free operation protocol is indeed possible, method 200 proceeds to transmit tandem free operation frames to a second base station (STEP 230). Typically, tandem free operation frames (TFO frames or TFO speech frames) are packets of data that generally include a portion of the compressed signal. TFO frames are typically exchanged between transcoders associated with the base stations involved in the signal transmission. Generally, TFO frames are transmitted by a transceiver using in-band signaling. In various embodiments, TFO frames may be of a fixed size, for example 320 bits, or may cover 160 8-bit octets, which corresponds to a time period of approximately 20 ms. Because the TFO frame is generally capable of transmitting the signal in its compressed format, the signal degradation associated with the decoding step (STEP 125) of method 100 is not necessary, and is therefore bypassed.

Method 200 next receives the TFO frames at the second base station (STEP 235). Typically, a transceiver associated with the second base station is capable of receiving the signal. There is no need for the second base station to encode or compress the signal because the TFO frames carry the signal in its encoded compressed form. The remaining steps of method 200 are similar to those of method 100. Method 200 next transmits the compressed encoded signal from the second base station to the second mobile station (STEP 240), where it is received by the second mobile station (STEP 245). Once the encoded signal is received by second mobile station (STEP 245) method 200 proceeds to decode and decompress the signal (STEP 255). In tandem free operation, this is typically the first time the signal is decoded since it was encoded by the fist mobile station (STEP 210), resulting in only a single codec operation before the decoded signal, generally in the form of an audible speech signal, is outputted from the second mobile station to a listener (STEP 255).

Figure 3:
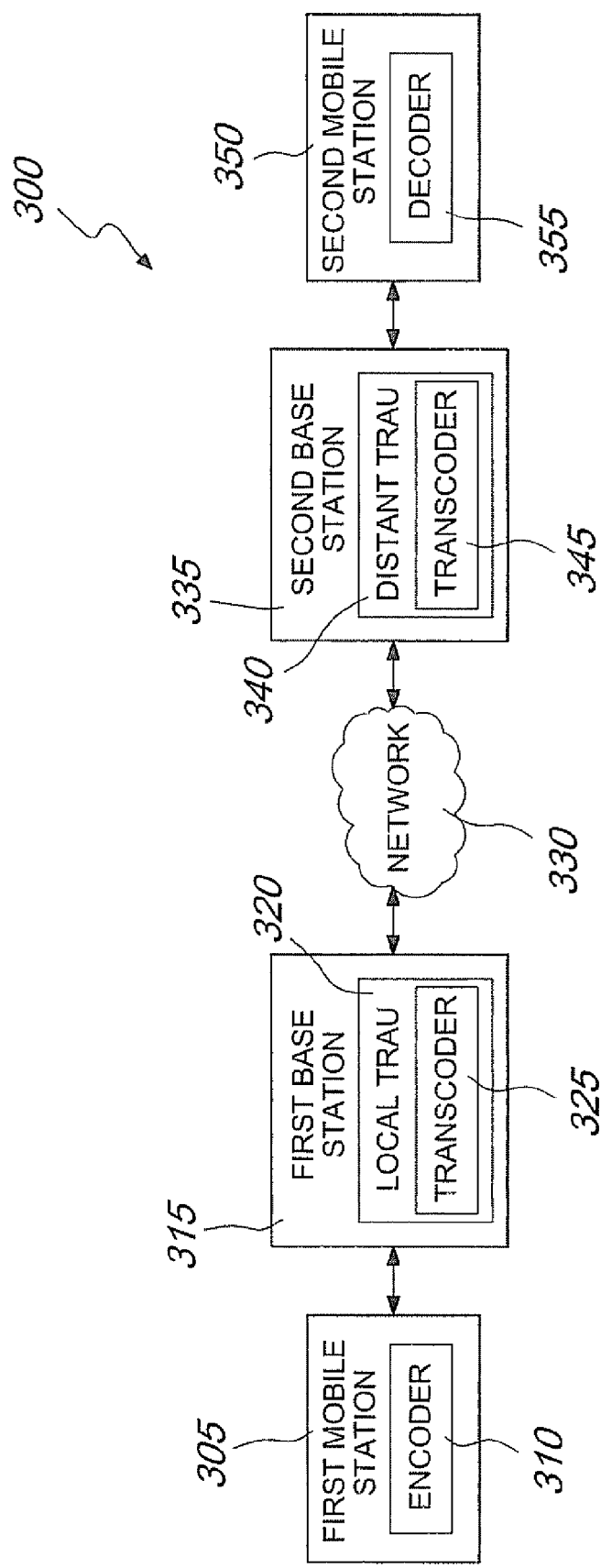
FIG. 3 is a block diagram of a system depicting a mobile station to mobile station (MS-MS) telephone network and associated components through which a signal may be transmitted in tandem free operation in accordance with an embodiment of the invention.

In brief overview, FIG. 3 is a is a block diagram of a system 300 depicting a mobile station to mobile station (MS-MS) telephone network and associated components through which a signal is transmitted in accordance with an embodiment of the invention. In various embodiments, system 300 may represent any type of communication system. System 300 includes a first mobile station 305. First mobile station 305 may include a wireless telephone such as a mobile or cellular telephone, a personal digital assistant, (PDA) palmtop, and any wireless communication device. First mobile station 305 is generally capable of receiving as input a signal such as an audio signal, like human speech. Once a signal is received by first mobile station 305, the signal may then be encoded by encoder 310. Encoder 310 may be included as part of, or may be associated with, first mobile station 305, and encoder 310 generally converts analog speech into a compressed digital signal stream suitable for transmission over a radio frequency (RF) interface. The signal is typically encoded by encoder 310 so that it may be transmitted through the air. Encoder 310 may be any device capable of compressing the signal, which may be human speech, at least in part to conserve bandwidth. In various embodiments, the input to first mobile station 305 may be an analog signal such as a voice signal, and encoder 310 may include an analog to digital converter to convert a signal like analog speech to a digital signal at a compressed data rate. Encoder 310 may be referred to as a speech encoder, may include a decoder, and may collectively be known as any of a coder/decoder, codec, transcoder, or vocoder (voice coder/decoder). In various embodiments, encoder 310 may include a Code Division Multiple Access Enhanced Variable Rate Codec (CDMA-EVRC), Enhanced Full Rate (EFR)

codec, or a Global Service for Mobile Communications (GSM) Adaptive Multi Rate (AMR) vocoder.

The encoded signal created by encoder 310 is then typically transmitted from first mobile station 305 over an RF interface through the air to a first base station 315. First base station 315 may also be known as a local base station or a near base station. First base station 315 may act as the interface between first mobile station 305 and the network and associated components necessary to complete the mobile station to mobile station signal transmission. A base station in general is a radio transceiver attached to a fixed antenna that may be associated with an appropriate network for mobile to mobile (MS-MS) or other communications.

First base station 315 generally includes a Local Transcoder Rate Adapter Unit 320 (local TRAU). Local TRAU 320 may be included within, associated with, or separate from first base station 315. Local TRAU 320 may also be referred to as a Local Transcoder and Rate Adapter Unit, L_TRAU, first TRAU, or TRAU. Because local TRAU 320 is generally a unit capable of performing encoding, decoding, or other operations on a signal as part of the overall communications system, local TRAU 320 may include a transcoder 325, which is generally an encoder/decoder device or system for performing encoding or decoding operations on a signal.

Local TRAU 320 is generally capable of generating packets of information, called TRAU frames. These TRAU frames are then transmitted across a communication network where they may be received by a second transcoder rate adapter unit other than the one from which they were sent. In tandem operation, TRAU transmit the signal, such as a voice signal, as well as other data in a decompressed format such as a standardized 64 kbps format. However, when tandem free operation protocol is implemented, local TRAU 320 is capable of transmitting tandem free operation frames, and may also be capable of generating and receiving tandem free operation frames. Among other things, tandem free operation frames (also called TFO frames, or TFO speech frames) generally include the signal after it was encoded and compressed by encoder 310 and transmitted from first mobile station 305 to first base station 315. In an embodiment, TFO frames have a fixed size of 320 bits, corresponding to a time period of 20 ms. In various embodiments, TRAU frames are converted into TFO frames. Thus, Local TRAU 320, through the use of tandem free operation frames, are able to pass on the encoded compressed signal in the form of TFO frames.

TFO frames are typically transmitted by local TRAU 320 to a network 330. Network 330 may include any of the Third Generation Partnership Project (3GPP), European Telecommunications Standards Institute (ETSI), American National Standards Institute (ANSI) or other standard telecommunications network architectures. Network 330 may be a Global System for Mobile communications (GSM) network, a Code Division Multiple Access (CDMA) wireless network, a Time Division Multiple Access (TDMA) wireless network, or a Universal Mobile Telecommunication System (UMTS) standard network. In various embodiments, the network 330 may include a local area network (LAN), wide area network (WAN), the Internet, or an Intranet. Network 330 may be fixed, mobile, or digital, and generally includes any communications architecture that enables the connection of a call placed from a calling party to a called party.

TFO frames are typically transmitted by local TRAU 320 through network 330 using what is known as in-band signaling or bit-robbing. This is generally accomplished by inserting the TFO frames into spare bits, such as the least significant bit (LSB) of other signals, such as a sample pulse code modulation (PCM) bit stream.

The TFO frames are transmitted from local TRAU 320 across network 330 to second base station 335. Second base station 335 is generally similar in all functional respects to, and is interchangeable with, first base station 315. Second base station 335 typically includes a transcoder rate adapter unit generally called a distant TRAU 340.

Distant TRAU 340 may be included within, associated with, or separate from second base station 335. Distant TRAU 340 may also be referred to as a Distant Transcoder and Rate Adapter Unit, D_TRAU, second TRAU, or TRAU. Because distant TRAU 340 is generally a unit capable of performing encoding and decoding operations on a signal as part of the overall communications system, distant TRAU 340 may include a transcoder 345, which is generally an encoder/decoder device or system for performing encoding or decoding operations on a signal. Distant TRAU 340 may also be the component of second base station 335 that receives TFO frames that include the encoded speech signal.

Second base station 335 also generally relays the signal from network 330 to a second mobile station 350. In various embodiments, second mobile station 350 may include a wireless telephone such as a mobile or cellular telephone, a personal digital assistant, (PDA) palmtop, or any wireless communication device. Second mobile station 350 typically receives as input the encoded signal that was transmitted from second base station 335 or a component included within or integral to second base station 335, such as for example distant TRAU 340. Second mobile station 350 typically decodes the signal received from second base station 335 by use of a decoder 355. Second mobile station 350 may also include an encoder, not shown, but analogous to the encoder of first mobile station 305.

Second mobile station 350 typically decodes the signal into audible human speech and is generally capable of transmitting as output the reconstructed signal such as an audio signal to a listener. In certain embodiments, decoder 355 includes a digital to analog converter to convert the compressed digital signal that second mobile station 350 received from second base station 335 to an analog signal, such as an audible voice signal.

In a typical embodiment, it is the communication between local TRAU 320 and distant TRAU 340 that determines if tandem free operation will proceed. If the general requirements for tandem free operation are met, (which may include at least one of requiring MS-MS communication), all components using the same encoding standards (such as a Global System for Mobile Communications coding standard), and digitally transparent signal transmission between local TRAU 320 and distant TRAU 340, then TFO frames may be exchanged between local TRAU 320 and distant TRAU 340. In certain embodiments, local TRAU 320 and distant TRAU 340 are in communication with each other and contain or are associated with the logic necessary to make the determination to proceed with tandem free operation. In the event tandem free operation is not permitted, TRAU 320 and distant TRAU 340 and their respective transcoders 325 and 345 are typically capable of proceeding with standard tandem operation.

In various embodiments, first mobile station 305 may function as second mobile station 350 and second mobile station 350 may act as first mobile station 305 in all respects, and first base station 315 may function as second base station 335 in all respects. They are interchangeable. Local TRAU 320 and distant TRAU 340 are similarly interchangeable. For example, first mobile station 305 may include a decoder analogous to that of decoder 355, first base station 315 may include a distant TRAU analogous to distant TRAU 340.

During tandem free operation, local TRAU 320 and distant TRAU 340 may operate in several different functional states during the course of determining if tandem free operation is available and during the subsequent signal transmission. One of these functional states is known as the operation state (OPE state).

The OPE state is the primary functional tandem free operation protocol state. In the OPE state tandem free operation is available and fully functional. The OPE state is generally the desired state for local TRAU 320 and distant TRAU 340 when system 300 is implementing tandem free operation protocol.

Typically, local TRAU 320 and distant TRAU 340 communicate with each other to determine if tandem free operation is available. If it is, once a given number of TFO frames are transmitted and received, both TRAUs 320 and 340 will synchronize and enter the OPE state.

Generally local TRAU 320 and distant TRAU 340 are able to send and receive signals such as TFO frames when operating in the OPE state. There is generally a synchronous transfer of TFO frames between local TRAU 320 and distant TRAU 340 when both TRAUs 320 and 340 are operating in the OPE state. Additionally, when a TRAU is operating in the OPE state, the encoding/decoding functions associated with that TRAU are suspended and thus the additional codec operation that contributes to signal degradation is bypassed.

Another state is known as the synchronization lost state (SOS state or Synch Lost State). The SOS state typically occurs when local TRAU 320, distant TRAU 340, or both were operating in the OPE state but at least one of them stops operating in the OPE state and enters the SOS state.

This change in functional states is generally referred to as an oscillation. Oscillation into the SOS state may be triggered by a long propagation delay during tandem free operation signal transmission between two TRAUs 320, 340. Oscillation from OPE to SOS may occur when an insufficient number of TFO frames are received. For example, three consecutive missing TFO frames may trigger OPE to SOS oscillation. Oscillation from SOS to OPE may occur when at least one TFO frame is received. Generally, an oscillation may also be referred to as a state change, and the full swing from OPE to SOS and back to OPE may be collectively referred to as SOS oscillation.

When a local TRAU 320 or a distant TRAU 340 enter the SOS state, that TRAU generally stops sending or receiving TFO frames. This oscillation into the SOS state results in a loss of synchronization between local TRAU 320 and distant TRAU 340, and the failure of one of the TRAUs to send or receive TFO frames results in a frame gap of a varying number of TFO frames. As stated above, once a threshold number of TFO frames are properly sent and received, TRAUs 320 and 340 operate in the OPE state.

If too few TFO frames are sent or received, tandem free operation may not be available, resulting in standard tandem operation. However, in certain embodiments there may be a point when the number of frame gaps is too few to force standard tandem operation, but not yet enough to allow OPE operation. At points like this, TRAUs 320 and 340 may oscillate to and operate in the SOS state.

For example, in an embodiment local TRAU 320 and distant TRAU 340 may be operating in OPE state and may be receiving TFO frames sent over the network by local TRAU 320. Then distant TRAU 340 oscillates into SOS state. Upon this oscillation, distant TRAU 340 stops receiving TFO frames. However, local TRAU 320 may still be operating in OPE state and may still be transmitting TFO frames. Because distant TRAU 340 is operating in SOS state, these TFO frames will not be received by distant TRAU 340. This results in a loss of synchronization between local TRAU 320 and distant TRAU 340. Furthermore, the TFO frames include the compressed speech signal. Because these frames are transmitted from local TRAU 320 but not received by distant TRAU 340, a TFO frame gap (or frame gap) is created at distant TRAU 340.

Because every TFO frame generally includes a segment of encoded speech, the frame gap results in a loss of a portion of the speech signal, which results in a reduced quality speech signal during tandem free operation when the signal is outputted from second mobile station 350 to a listener. In various embodiments, when one of local TRAU 320 and distant TRAU 340 enters the SOS state, a reset procedure is performed to re-synchronize these TRAUs 320, 340 in the OPE state. However, during a typical re-synchronization process several oscillations between the OPE state and the SOS state generally occur, along with their associated frame gaps and resulting degradation in signal quality.

In various embodiments, this solution may be based on the principle of breaking the OPE-SOS swing in the two peers increasing gradually the number of TFO frames sent when the TFO state machine stays in SOS at every new oscillation. A TFO frame counter is used to determine for how long the TFO session remains in OPE stably. If this counter is less than a threshold it will indicate that an OPE-SOS oscillation has occurred. Consecutive OPE-SOS oscillations are counted.

At the first OPE-SOS oscillation or transition no new action may be taken other than to put a discontinue transmission message in the TX queue followed by four regular tandem free operation synchronization lost messages (TFO_SYL).

At the second transition, one TFO_SYL message is sent embedded, then a discontinue transmission is performed and three regular TFO_SYLs are sent. In this way the time a TRAU is operating in the OPE state is extended by the number of frames necessary to send the TFO_SYL, (i.e., by three frames).

In every further oscillation one more TFO_SYL is send embedded and one fewer regular TFO_SYL is sent, so that for example at the third transition, two TFO_SYLs are sent embedded, and two are sent regular, at the fourth transition, three TFO_SYLs are sent embedded, and one is sent regular, and at the fifth transition four TFO_SYLs are sent embedded, which may completely fill the time gap causes by the oscillations. This progressively shifts and overlaps in time the OPE states in the two TRAUs 320 and 340.

Figure 4A:
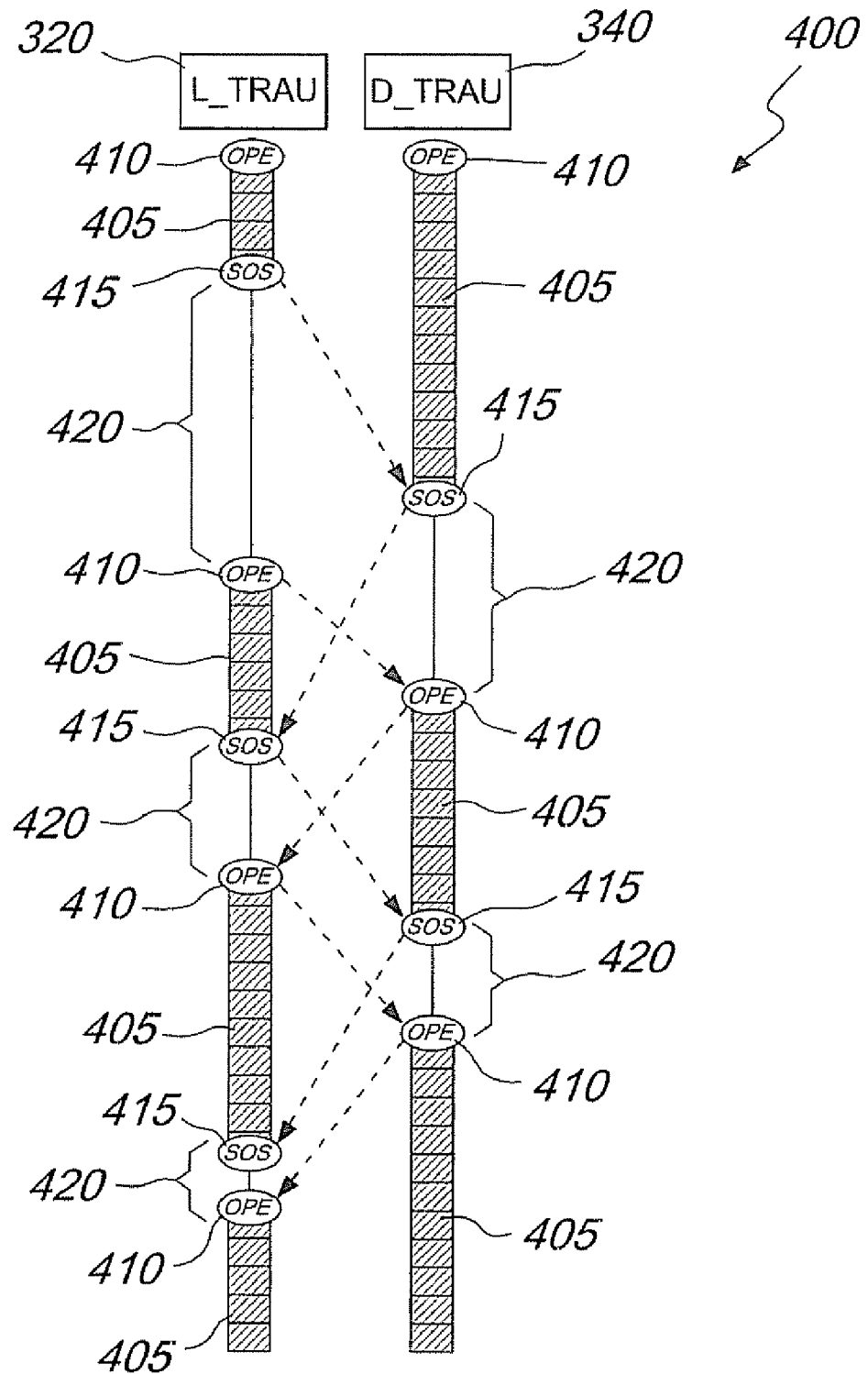
FIG. 4a is a diagram depicting the frame gaps resulting from oscillation of a first transcoder rate adapter unit and a second transcoder rate adapter unit between an operation state and a synchronization lost state during tandem free operation in accordance with an embodiment of the invention.

An embodiment of the frame gaps is illustrated in FIG. 4. In brief overview, FIG. 4 is a diagram 400 depicting the frame gaps resulting from oscillation of a first transcoder rate adapter unit and a second transcoder rate adapter unit between an operation state and a synchronization lost state during tandem free operation in accordance with an embodiment of the invention.

In this illustrative embodiment, TFO frames 405 are being transmitted between local TRAU 320 and distant TRAU 340. The functional state of TRAUs 320 and 340 is typically determined at least in part by TFO frames 405. In the illustrative embodiment of FIG. 4, it can be seen that both local TRAU 320 and distant TRAU 340 initially operating in OPE state 410, but after a period of time, they begin to oscillate between OPE state 410 and SOS state 415. Generally a frame gap 420 occurs when at least one of the TRAUs 320, 340 operates in SOS state 415.

Frame gap 420 is typically formed because when one of TRAUs 320, 340 operates in SOS state 415, it is generally incapable of receiving or sending TFO frames 405. In certain embodiments, distant TRAU 340 in SOS state 415 may be incapable of receiving TFO frames 405 but for a period of time local TRAU 320 continues to transmit TFO frames because local TRAU 320 is unaware that distant TRAU 340 has oscillated into the operating state. As a result, the encoded speech signal and any other data associated with TFO frames 405 that are not received by distant TRAU 340 is lost, resulting in reduced signal quality. In a typical embodiment, frame gap 420 may last for up to 300 ms before the TRAUs 320, 340 are able to re-synchronize in the OPE state.

In general, the present invention reduces or eliminates TFO frame gap 420 by continuing transmission of TFO frames 405 while one of the TRAUs 320, 340 is operating in SOS state 415. The reduction in the time period (or length) of frame gap 420 corresponds to a reduction of the amount of the signal that is lost. This corresponds to increased signal quality.

Figure 4B:
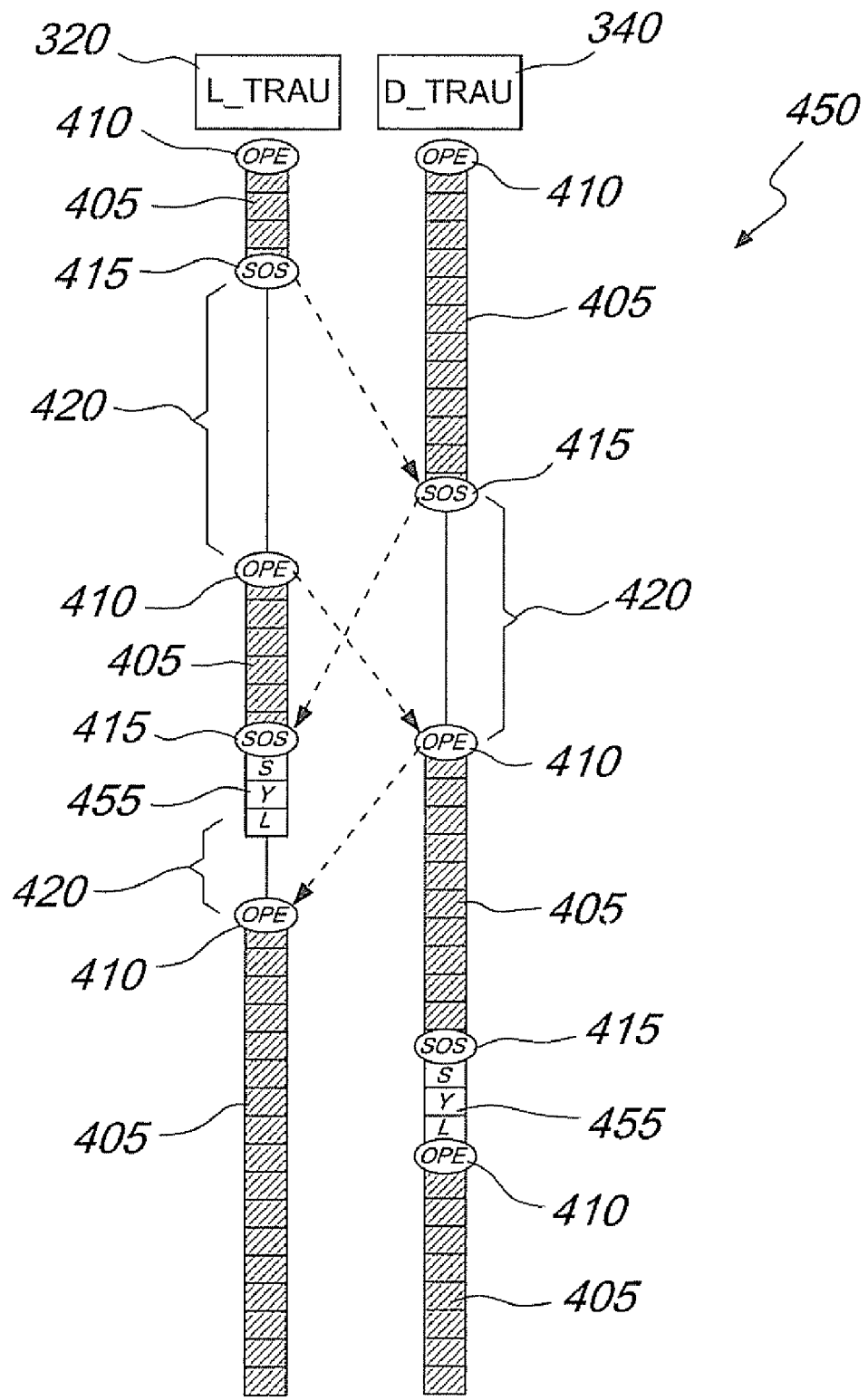
FIG. 4b is a diagram depicting oscillation of a first transcoder rate adapter unit and a second transcoder rate adapter unit between an operation state and a synchronization lost state where embedded synchronization lost messages reduce signal distortion in accordance with an embodiment of the invention.

This increased signal quality is visualized in the exemplary embodiment of FIG. 4b. In brief overview, FIG. 4b is a diagram 450 depicting oscillation of a first transcoder rate adapter unit and a second transcoder rate adapter unit between an operation state and a synchronization lost state where embedded synchronization lost messages reduce signal distortion in accordance with an embodiment of the invention.

In this illustrative embodiment, local TRAU 320 has been adapted to continue transmission of a TFO frame when operating in SOS state 415. This special type of TFO frame is referred to as TFO frame 455. Generally, TFO frame 455 includes a portion of the encoded speech signal TFO signal, as well as a separate embedded message.

Typically TFO frame 405 is embedded with a message to become TFO frame 455. The embedded message may be a Synchronization Lost Message (SYL) and TFO frame 455 may be referred to as TFO_SYL. The synchronization lost message is typically transmitted by a TRAU such as local TRAU 320 in response to oscillation into SOS state 320. The purpose of the synchronization lost message is to inform the corresponding TRAU such as distant TRAU 340 of a loss of synchronization.

In an embodiment, the synchronization lost message may be in response to one of the TRAUs 320, 340 no longer receiving TFO frames 405. Generally the quickest and most efficient way to accomplish this task after a TRAU has oscillated into SOS state 415 is to create at least one TFO frame 455 and transmit it to the corresponding TRAU. As illustrated in diagram 450 this results in a reduction or elimination of frame gap 420 because the corresponding TRAU receives the TFO embedded frames 455 in what would otherwise be frame gap 420. Generally, TFO embedded frames 455 at least partially fill frame gap 420. Because the TFO embedded frames 455 that fill frame gap 420 include the signal that is being transmitted from one mobile station to another mobile station, this corresponds to more of the signal being successfully transmitted, and results in increased signal quality.

Figure 5:
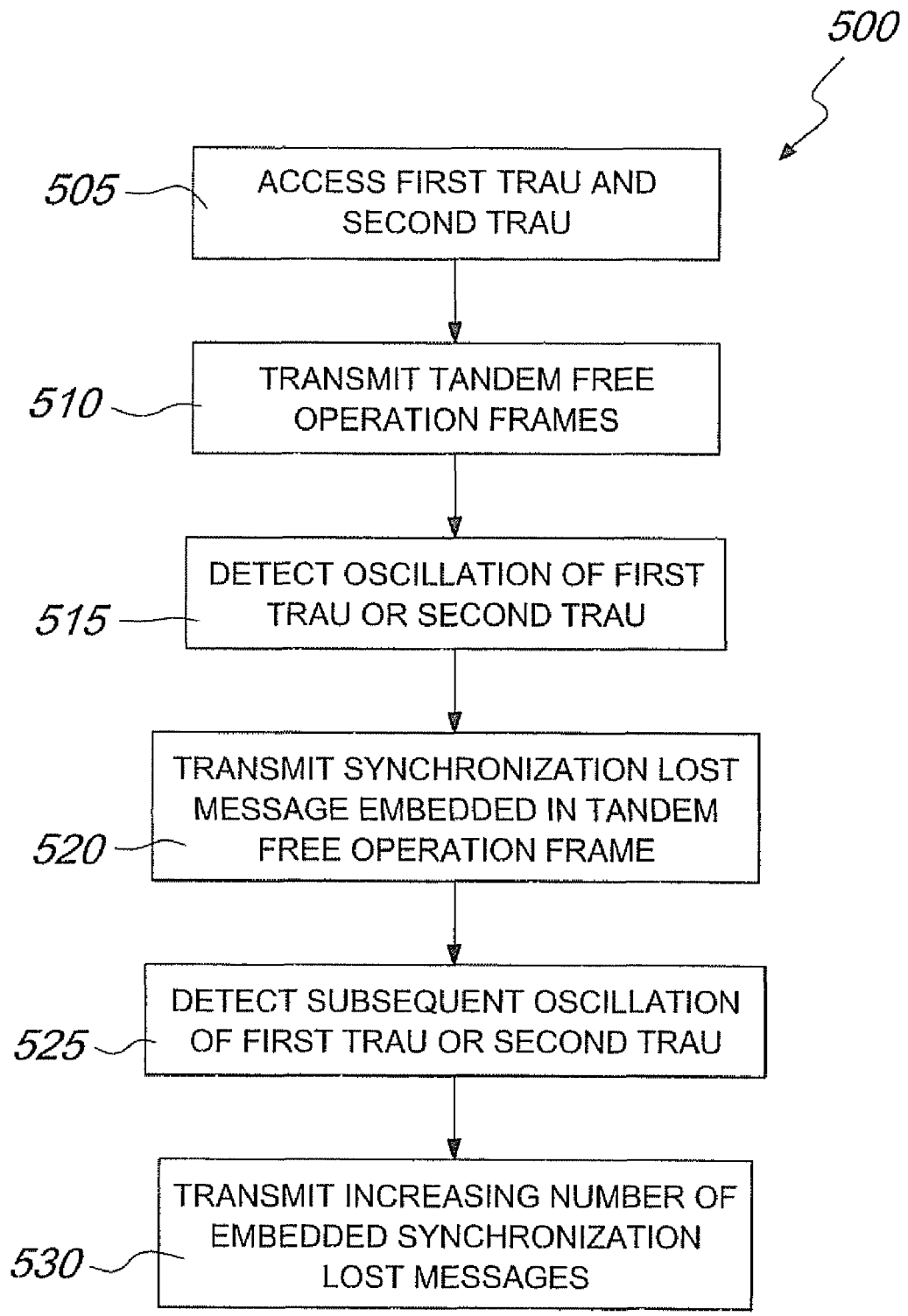
FIG. 5 is a flow chart depicting a method for reducing tandem free operation signal transmission distortion in mobile station to mobile station communication in accordance with an embodiment of the invention.

In brief overview, FIG. 5 is a flow chart depicting a method 500 for reducing tandem free operation signal transmission distortion in mobile station to mobile station communication in accordance with an embodiment of the invention. Method 500 typically first includes the step of accessing a first transcoder rate adapter unit and a second transcoder rate adapter unit (STEP 505).

Generally accessing (STEP 505) includes any means for communicating with, associating with, or coupling to a first transcoder rate adapter unit and a second transcoder rate adapter unit. In various embodiments, this may include electronic communication with or between first and second transcoder rate adapter units. In certain instances this electronic communication may be direct, indirect, wired, or wireless.

Accessing a first transcoder rate adapter unit and a second transcoder rate adapter unit may include accessing a state machine. A state machine generally includes a plurality of functional states where the units associated with the state machine operate in one functional state until the occurrence of an oscillation event changes the functional state to a different functional state.

A state machine does not have to include all components in the same physical device. For example the state machine may be defined to include at least the first transcoder rate adapter unit and the second transcoder rate adapter unit, as well as the intervening network or other components used for communication between the two units.

Method 500 next includes the step of transmitting one or more tandem free operation frames (STEP 510). In a typical embodiment, the tandem free operation frames are transmitted over a network, such as a global system for mobile communications (GSM) network. Generally, transmitting one or more tandem free operation frames (STEP 510) may include transmitting the tandem free operation frames over any network capable of handling mobile station to mobile station (MS-MS) or other wireless communication. In various embodiments, the tandem free operation frames may be transmitted from the first transcoder rate adapter unit to the second transcoder rate adapter unit, or vice versa. The tandem free operation frames include at least a portion of the signal being transmitted during the MS-MS communication, generally the complete speech.

Method 500 next includes detecting the oscillation of a functional state of at least one of the first transcoder rate adapter unit and the second transcoder rate adapter unit (STEP 515). First and second transcoder rate adapter units are generally capable of operating in a plurality of functional states.

The functional state a transcoder rate adapter unit is operating in during transmission of tandem free operation frames (STEP 510) is typically referred to as the operation state (OPE state). Transcoder and rate adapter units may also operate in the synchronization lost state (SOS state). When the functional state of a transcoder rate adapter unit changes, for example from the OPE state to the SOS state, that transcoder rate adapter unit is said to have oscillated from one state to another state.

Generally, detection of this oscillation (STEP 515) may occur by any means. For example, a message or signal may be transmitted or received to or from one of the transcoder and rate adapter units indicating an oscillation. Furthermore, failure of at least one of the first or second transcoder rate adapter units to transmit or receive tandem free operation frames for a given time period may be interpreted as indicating an oscillation has taken place, and may be considered detecting an oscillation (STEP 515).

Additionally, a tandem free operation frame counter may count the number of transmitted or received tandem free operation frames and determine that an oscillation has occurred if the number of transmitted or received tandem free operation frames is less than a predetermined number. In some embodiments, detecting oscillation (STEP 515) may include detecting the oscillation of one of the first or second transcoder rate adapter units from one functional state (such as the OPE state) to another functional state (such as the SOS state).

In response to detecting the oscillation (STEP 515) method 500 generally proceeds to transmit at least one synchronization lost message embedded in at least one tandem free operation frame (STEP 520). For example, the synchronization lost message embedded in at least one tandem free operation frame may be transmitted from the first transcoder rate adapter unit to the second transcoder rate adapter unit. Typically, the synchronization lost message is included in the bits that comprise the tandem free operation frame, and therefore may be said to be embedded in the tandem free operation frame.

In some embodiments, method 500 may also include the step of detecting at least one subsequent oscillation of at least one of the first transcoder rate adapter unit and the second transcoder rate adapter unit (STEP 525).

Typically the detecting in STEP 525 is accomplished by the same means used for the detection of STEP 515. Generally any number of subsequent oscillations may be detected. In an embodiment, the number of subsequent oscillations detected is less than or equal to four, so that the total number of oscillations is less than or equal to five. In response to detecting at least one subsequent oscillation (STEP 525), method 500 may continue to transmit an increasing number of embedded synchronization lost messages (STEP 530).

This transmission generally occurs by the same means as the transmission of STEP 520, for example from the first transcoder rate adapter unit to the second transcoder rate adapter unit over a network capable of facilitating MS-MS communication. Generally, these increasing number of synchronization lost messages are embedded within at least one tandem free operation frames, and they may be transmitted from the first transcoder rate adapter unit to the second transcoder rate adapter unit. Typically, the synchronization lost messages and the tandem free operation frames they are embedded within fill the time gap created when one of the first transcoder rate adapter units and the second transcoder rate adapter units oscillates into the SOS state.

Figure 6:
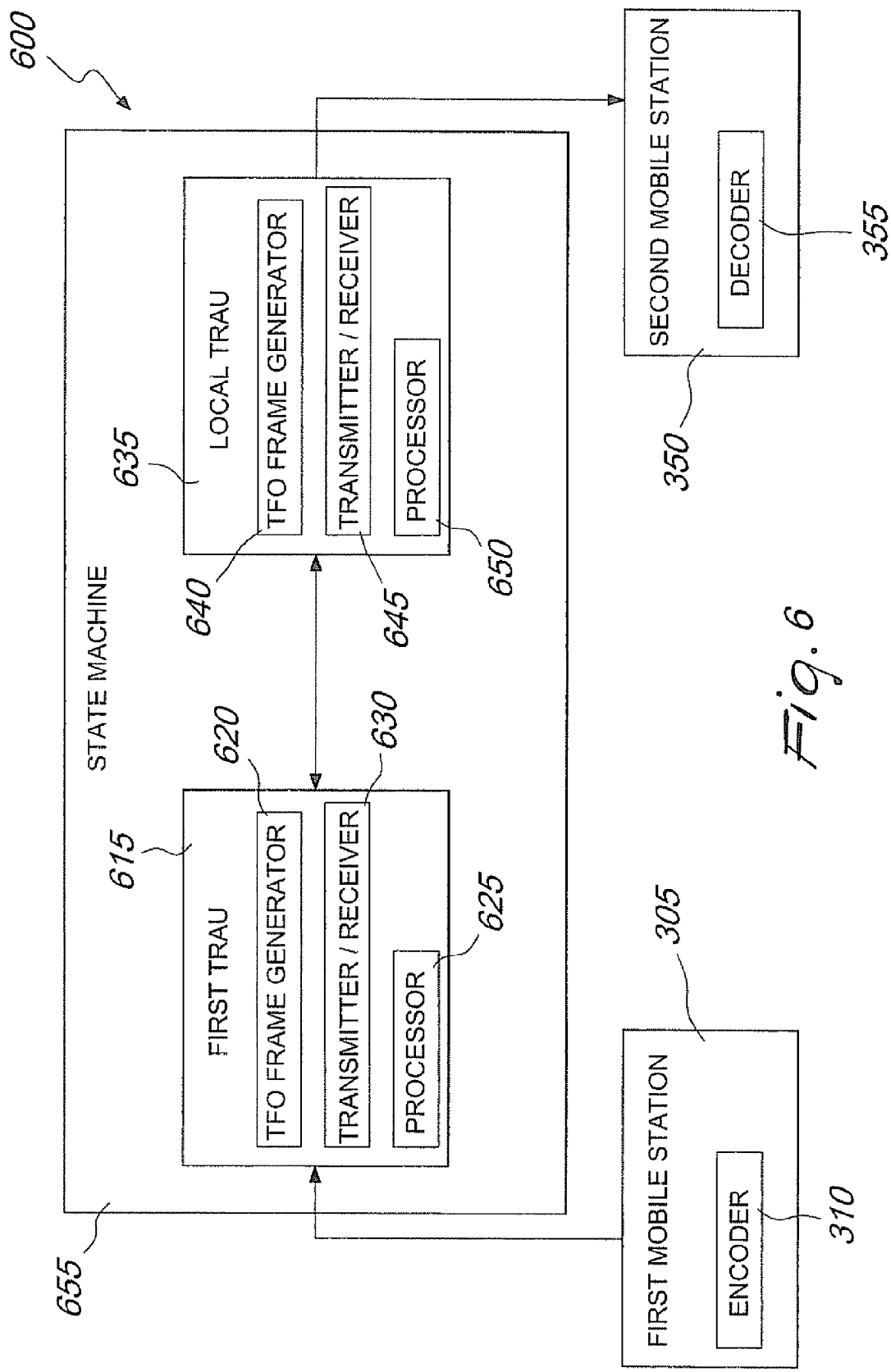
FIG. 6 is a block diagram depicting a system for reducing tandem free operation signal transmission distortion in mobile station to mobile station communication in accordance with an embodiment of the invention.

In brief overview, FIG. 6 is a block diagram depicting a system 600 for reducing tandem free operation signal transmission distortion in mobile station to mobile station communication in accordance with an embodiment of the invention. System 600 generally includes a first mobile station 305.

First mobile station 305 may include a mobile telephone. First mobile station 305 also may also include an encoder 310, which may encode an analog human voice signal into an encoded compressed digital signal. Encoder 310 may also include a decoder (not shown). For example human speech into first mobile station 305 may be encoded into a digital compressed 8 kbps signal.

System 600 also includes a first transcoder and rate adapter unit 615 (first TRAU). First TRAU 615 may be identical in all respects to local TRAU 320 or distant TRAU 340. Typically, the compressed digital signal is transmitted wirelessly to first TRAU 615. In typical tandem free operation, first TRAU 615 receives the compressed digital signal from first mobile station 315 and transmits it as a plurality of tandem free operation frames 405. In certain embodiments, the tandem free operation frames are generated by a tandem free operation frame generator 620. In various embodiments, frame generator 620 takes the compressed signal from first mobile station 305 and forwards the signal on using the least significant bit of existing in-line or in-band MS-MS communications. This signal is typically transmitted when first TRAU 615 is functioning in OPE state 410. When operating in the SOS state 415, first TRAU 615 may continue to transmit at least one tandem free operation frame 405 that includes a synchronization lost message in TFO embedded frames 455.

First TRAU 615 may also include a processor 625 generally capable of performing logic operations. Processor 625 may include a central processing unit of a computer, and processor 625 may be integral to or associated with first TRAU 615. First TRAU 615 also typically includes a transmitter/receiver 630 that is capable of transmitting a signal, such as the compressed speech signal as part of the in-band MS-MS communication or related information, as well as receiving the compressed signal from first mobile station 305.

First TRAU 615 typically communicates with a second transcoder rate adapter unit 635 (second TRAU). In some instances, this communication takes place over a network capable of supporting MS-MS or other wireless communication. Second TRAU 635 may be identical in all respects to distant TRAU 340 or local TRAU 320. Generally, second TRAU 635 receives the tandem free operation frames 405 or TFO embedded frames 455 (tandem free operation frames with embedded synchronization lost messages) that were transmitted from first TRAU 615. First TRAU 615 and second TRAU 635 are both generally capable of operating in a plurality of functional states, such as OPE state 410 and SOS state 415, and first TRAU 615 and second TRAU 635 typically communicate with each other to determine if they are in the same functional state. First TRAU 615 and second TRAU 635, or any two or more TRAUs in communication with each other may be referred to as "peer TRAUs".

Second TRAU 635 may also include a TFO frame generator 640, a transmitter/receiver 645, and a processor 650, all of which are generally similar in all respects to TFO frame generator 620, transmitter/receiver 630, and processor 625. In various embodiments, second TRAU 635 takes the compressed voice signal contained in tandem free operation frames 405 and transmits it over an air interface to second mobile station 350. A decoder 355 associated with second mobile station 350 then decodes the compressed signal into a reconstructed signal. Decoder 355 may include a digital to analog converter for converting the compressed digital signal to an analog audio signal.

System 600 may also include a state machine 655. State machine 655 generally includes a plurality of functional states where the units associated with state machine 655 operate in one functional state until the occurrence of an oscillation event changes the functional state to a different functional state. State machine 655 does not have to include all components in the same physical device or to be in the same physical location. State machine 655 may include any set of peer TRAUs, such as first TRAU 615 and second TRAU 635.

Various embodiments of the invention continue transmission of TFO frames 405 or TFO embedded frames 455 after a TRAU, such as first TRAU 615 or local TRAU 320 oscillates into SOS state 415. The systems and methods of the invention may continue to transmit an increasing number of TFO embedded frames 455 with the synchronization lost message at every subsequent oscillation into SOS state 415. For example, a TFO frame counter may be used to determine how long tandem free operation between any TRAUs remains in the stable OPE state 410.

In various embodiments if the counter is less than a threshold predetermined number an oscillation of a TRAU into SOS state 415 may be deemed to have occurred. Consecutive or subsequent oscillations may also be counted, and at the first detected oscillation, one TFO frame 455 with synchronization lost message may be transmitted between any two TRAUs. If one or more TRAUs oscillates subsequent to this first oscillation, two TFO frames 455 with synchronization lost messages may be transmitted between the same two TRAUs.

An increasing number of TFO frames 455 with embedded synchronization lost messages are then be transmitted between these two TRAUs with every subsequent oscillation until the TRAUs are operating in OPE state 410 without oscillation. In certain embodiments, the first TFO frame 455 with synchronization lost message may not be transmitted between any two TRAUs until detection of the second oscillation, (which is the first subsequent oscillation). In these illustrative examples, it can be seen that the TFO frames 455 shift and overlap in time the OPE states 410 between any two TRAUs.

The systems and methods in this invention are compatible with existing tandem free operation protocol standards, such as those set forth by the 3GPP (Third Generation Partnership Project), European Telecommunications Standards Institute (ETSI) as Global System for Mobile Communications (GSM), and the Telecommunications Industry Association (TIA).

Note that in FIGS. 1 through 6, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods provided by the invention afford a simple and effective way to reduce signal distortion during tandem free operation signal transmission by minimizing the number and time of OPE state 410 to SOS state 415 oscillations and encourages TRAU convergence back into OPE state 410. The systems and methods according to embodiments of the invention are able to operate on existing networks and associated components. This increases efficiency and compatibility, and lowers cost.

One skilled in the art will realize the invention may be embodied in other specific forms without departing from the spirit or essential characteristics thereof. The foregoing embodiments are therefore to be considered in all respects illustrative rather than limiting of the invention described herein. The scope of the invention is thus indicated by the appended claims, rather than the foregoing description, and all changes that come within the meaning and range of equivalency of the claims are therefore intended to be embraced therein.

The invention claimed is:

1. A method for improving quality, by eliminating speed gaps, during tandem free operation (TFO) signal transmission over a network comprising a first transcoder rate adapter unit and a second transcoder rate adapter unit, the method comprising the steps of:
    eliminate the time period of speech gaps that occur as a result of oscillation of transcoder rate adapter units between different functional states,
    transmitting a plurality of tandem free operation frames from the first transcoder rate adapter unit to the second transcoder rate adapter unit;
    detecting a state change of the first transcoder rate adapter unit from an operation state to a synchronization lost state;
    in response to detecting the state change, transmitting from the first transcoder rate adapter unit to the second transcoder rate adapter a synchronization lost (SYL) message embedded in a number of tandem free operation frames sufficient to embed the synchronization lost message;
    detecting a plurality of subsequent state changes of the first transcoder rate adapter unit from the operation state to the synchronization lost state;
    in response to a first state change, sending a discontinue transmission message in the TX queue followed by four regular tandem free operation synchronization lost (TFO SYL) messages; and
    responsive to a second state change, embedding a first TFO_SYL message, followed by three regular TFO_SYL messages, and following each of the plurality of subsequent state changes, sending one more embedded TFO_SYL message and one fewer regular TFO_SYL messages is sent until a time gap caused by the oscillations is completely filled.

2. The method of claim 1, wherein the step of transmitting at least one synchronization lost message comprises:
    transmitting synchronization lost message embedded in three tandem free operation frames.

3. The method of claim 1, wherein four synchronization lost messages are transmitted.

4. The method of claim 1, wherein detecting the state change further comprises:
    determining a length of time the first transcoder rate adapter unit has been operating in the operation state;
    comparing the length of time to a predetermined time period; and
    determining the first transcoder rate adapter unit to have changed from the operation state to the synchronization lost state if the length of time is less than the predetermined time period.

5. The method of claim 1, wherein detecting the state change further comprises:
    counting, by use of a tandem free operation frame counter, a number of tandem free operation frames received from the second transcoder rate adapter unit;
    comparing with a predetermined number the number of tandem free operation frames received; and
    determining the first transcoder rate adapter unit to have changed from the operation state to the synchronization lost state if the number of tandem free operation frames received is less than the predetermined number.

6. The method of claim 1, wherein a state change counter counts a number of the state changes and the number of embedded synchronization lost messages is adapted to the number of state changes.

7. A method for improving quality during tandem free operation signal transmission over a network comprising a first transcoder rate adapter unit and a second transcoder rate adapter unit, the method comprising the steps of:
    receiving, by the second transcoder rate adapter unit from the first transcoder rate adapter unit, a plurality of tandem free operation frames at least one synchronization lost message being embedded in the plurality of tandem free operation (TFO) frames,
    determining if the second transcoder rate adapter unit is in operation state or changed to synchronization lost (SYL) state;
    if the second transcoder rate adapter unit is in operation state, continuing to send tandem free operation frames from the second transcoder rate adapter unit to the first transcoder rate adapter unit and discarding the at least one received synchronization lost message; and
    if the second transcoder rate adapter unit has changed state to synchronization lost state a second time, upon detecting the second state change, receiving an embedded Tandem Free Operation Synchronization Lost (TFO_SYL) message followed by three regular TFO_SYL messages, and following each subsequent state change, receiving one more embedded TFO_SYL message and one fewer TFO_SYL message until a time gap caused by the state changes is filled.

8. A first transcoder rate adapter unit for improving quality, by eliminating speech gaps, during tandem free operation signal transmission over a network comprising the first transcoder rate adapter unit and a second transcoder rate adapter unit, the first transcoder rate adapter unit comprising:
- a transmitter adapted to transmit a plurality of tandem free operation frames to the second transcoder rate adapter unit;
- a detector adapted to detect a state change of the first transcoder rate adapter unit from an operation state to a synchronization lost state;
- the transmitter adapted to transmit in response to detection of a first state change to the second transcoder rate adapter unit a discontinue transmission message in the TX queue followed by four regular tandem free operation synchronization lost message;
- the transmitter, responsive to a second state change, a first synchronization lost message embedded in a number of tandem free operation frames sufficient to embed the at least one synchronization lost message followed by three regular synchronization lost messages;
- the detector adapted to detect a plurality of subsequent state changes of the first transcoder rate adapter unit from the operation state to the synchronization lost state; and following each of the plurality of subsequent state changes, one more synchronization lost message is sent embedded and one fewer regular synchronization lost message is sent until a time gap caused by the oscillations is completely filled.

9. The first transcoder rate adapter unit of claim 8 wherein the transmitter is adapted to transmit a one synchronization lost message embedded in at least three of tandem free operation frames.

10. The first transcoder rate adapter unit of claim 8 wherein the transmitter is adapted to transmit four synchronization lost messages.

11. The first transcoder rate adapter unit of claim 8 wherein the detector detecting the state change further comprises:
- a processor adapted to determine a length of time the first transcoder rate adapter unit has been operating in the operation state;
- a comparator adapted to compare the length of time to a predetermined time period; and
- the processor adapted to determine the first transcoder rate adapter unit to have changed from the operation state to the synchronization lost state if the length of time is less than the predetermined time period.

12. The first transcoder rate adapter unit of claim 8 wherein the detector detecting the state change further comprises:
- a tandem free operation frame counter adapted to count a number of tandem free operation frames received from the second transcoder rate adapter unit;
- a comparator adapted to compare with a predetermined number the number of tandem free operation frames received; and
- a processor adapted to determine the first transcoder rate adapter unit to have changed from the operation state to the synchronization lost state if the number of tandem free operation frames received is less than the predetermined number.

13. The first transcoder rate adapter unit claim 8 wherein a state change counter is adapted to count a number of the state changes and the number of embedded synchronization lost messages is adapted to the number of state changes.

14. A second transcoder rate adapter unit for improving quality during tandem free operation signal transmission over a network comprising a first transcoder rate adapter unit and the second transcoder rate adapter unit, the second transcoder rate adapter unit comprising:
- a receiver adapted to receive from the first transcoder rate adapter unit a plurality of tandem free operation frames at least synchronization lost message being embedded in the plurality of tandem free operation frames,
- a processor adapted to determine if the second transcoder rate adapter unit is either in operation state or changed to synchronization lost state, and
- if the second transcoder rate adapter unit is in operation state, the processor being adapted to instruct a transmitter to continue sending tandem free operation frames to the first transcoder rate adapter unit, or if the second transcoder rate adapter unit has changed state to synchronization lost state a second time, upon detecting the second state change, receiving an embedded Tandem Free Operation Synchronization Lost (TFO_SYL) message followed by three regular TFO_SYL messages and following each subsequent state change, receiving one more embedded TFOSYL message and one fewer TFO_SYL message until a time gap caused by the state changes is filled.

15. An apparatus, for improving quality during tandem free operation signal transmission over a network, by eliminating speech gaps, the apparatus comprising a first transcoder rate adapter unit and a second transcoder rate adapter unit, the apparatus comprising a computer system including:
- a processor;
- a main memory coupled to the processor; and
- persistent storage, associated with the computer system, the computer system executing instructions for
  - transmitting a plurality of tandem free operation frames from the first transcoder rate adapter unit to the second transcoder rate adapter unit;
  - detecting a first state change of the first transcoder rate adapter unit from an operation state to a synchronization lost state, and in response to the detection of a first state change to the second transcoder rate adapter unit sending a discontinue transmission message in the TX queue followed by four regular tandem free operation synchronization lost message;
  - responsive to a second state change, a first synchronization lost message embedded in a sufficient number of tandem free operation frames to embed the synchronization lost message, followed by three regular synchronization lost messages;
  - detecting a plurality of subsequent state changes of the first transcoder rate adapter unit from the operation state to the synchronization lost state; and following each of the plurality of subsequent state changes, one more synchronization lost message is sent embedded and one fewer regular synchronization lost message is sent until a time gap caused by oscillations is completely filled.

16. An apparatus for improving quality during tandem free operation signal transmission over a network, by eliminating speech gaps, the apparatus, comprising a first transcoder rate adapter unit and a second transcoder rate adapter unit, the apparatus comprising a computer system including:
  a processor;
  a main memory coupled to the processor; and
  persistent storage, associated with the computer system, the computer system executing instructions for:
    receiving by the second transcoder rate adapter unit from the first transcoder rate adapter unit a plurality of tandem free operation frames,
    determining if the second transcoder rate adapter unit is either in operation state or synchronization lost state by sending a discontinue transmission message in the TX queue followed by four regular synchronization messages, and
    if the second transcoder rate adapter unit is in operation state, continuing to send tandem free operation frames from the second transcoder rate adapter unit to the first transcoder rate adapter unit, or
    if the second transcoder rate adapter unit is in synchronization lost state, sending at least one synchronization lost message embedded in a sufficient number of tandem free operation frames to embed the synchronization lost message, followed by a predetermined number of regular synchronization messages until a time gap caused by oscillations of the second transcoder rate adapter unit is filled.

* * * * *

UNITED STATES PATENT AND TRADEMARK OFFICE
CERTIFICATE OF CORRECTION

PATENT NO. : 8,300,622 B2
APPLICATION NO. : 11/564992
DATED : October 30, 2012
INVENTOR(S) : Agnoni et al.

It is certified that error appears in the above-identified patent and that said Letters Patent is hereby corrected as shown below:

In the Drawing

In Fig. 1, Sheet 1 of 7, for Tag "125", in Line 2, delete "U-LAW" and insert -- µ-LAW --, therefor.

In the Claims

In Column 18, Line 10, in Claim 1, delete "(TFO SYL)" and insert -- (TFO_SYL) --, therefor.

In Column 18, Line 16, in Claim 1, delete "messages" and insert -- message --, therefor.

In Column 18, Lines 18-19, in Claim 2, after "transmitting", delete "at least".

In Column 18, Line 20, in Claim 2, delete "synchronization lost message" and insert -- the synchronization lost message --, therefor.

In Column 20, Line 1, in Claim 13, delete "unit claim" and insert -- unit of claim --, therefor.

In Column 20, Line 28, in Claim 14, delete "TFOSYL" and insert -- TFO_SYL --, therefor.

Signed and Sealed this
Sixteenth Day of July, 2013

Teresa Stanek Rea
*Acting Director of the United States Patent and Trademark Office*